US012002967B1

(12) United States Patent
Ahmed et al.

(10) Patent No.: US 12,002,967 B1
(45) Date of Patent: Jun. 4, 2024

(54) COBALT AND COPPER-DOPED NICKEL FERRITE NANOPARTICLES AS CATALYST FOR DIRECT METHANOL FUEL CELLS

(71) Applicant: KING FAISAL UNIVERSITY, Hofouf (SA)

(72) Inventors: Hany Mohamed Abd El-Lateef Ahmed, Hofouf (SA); Mai Mustafa Khalaf Ali, Hofouf (SA); Ibrahim Abdelhamid Mohamed Elsayed Elshaer, Hofouf (SA); Hadyl Hany Mohamed Abd El-Lateef, Hofouf (SA)

(73) Assignee: KING FAISAL UNIVERSITY, Hofouf (SA)

( * ) Notice: Subject to any disclaimer, the term of this patent is extended or adjusted under 35 U.S.C. 154(b) by 0 days.

(21) Appl. No.: 18/391,192

(22) Filed: Dec. 20, 2023

Related U.S. Application Data

(63) Continuation-in-part of application No. 18/231,056, filed on Aug. 7, 2023, and a continuation-in-part of application No. 18/124,709, filed on Mar. 22, 2023.

(51) Int. Cl.
*H01M 4/90* (2006.01)
*H01M 8/1011* (2016.01)
*H01M 8/10* (2016.01)

(52) U.S. Cl.
CPC ....... *H01M 4/9016* (2013.01); *H01M 8/1011* (2013.01); *H01M 2008/1095* (2013.01)

(58) Field of Classification Search
CPC .... H01M 4/9025; H01M 8/1011; C01G 53/40
See application file for complete search history.

(56) References Cited

U.S. PATENT DOCUMENTS 10,256,474 B2    4/2019    Im et al.

FOREIGN PATENT DOCUMENTS

| KR | 29169989884 A | 7/2016 | |
|---|---|---|---|
| WO | 2021076536 A1 | 4/2021 | |
| WO | WO-2021076536 A1 * | 4/2021 | ........... C01G 49/009 |

OTHER PUBLICATIONS

Askari, M.B. et al., "Hierarchical nanostructures of MgCo2O4 on reduced graphene oxide as a high-performance catalyst for methanol electro-oxidation", Ceramics Int. 47(11): pp. 16079-16085 (2021).

(Continued)

*Primary Examiner* — James A Fiorito
(74) *Attorney, Agent, or Firm* — Nath, Goldberg & Meyer; Richard C. Litman

(57) ABSTRACT

Cobalt and copper-doped nickel Cu/Co—Ni-ferrite nanoparticles having a general formula $Cu_xCo_xNi_{(1-x)}Fe_2O_4$ can be a catalyst for electrooxidation of methanol in direct methanol fuel cells (DMFC). The catalyst can be an efficient anode for DMFC in alkaline electrolytes. The Cu/Co—Ni-ferrite nanoparticles can have a sponge-like structure with irregular pores. A diameter of the Cu/Co—Ni-ferrite nanoparticles can range from about 8 nm to about 30 nm.

16 Claims, 5 Drawing Sheets

(56) References Cited

OTHER PUBLICATIONS

Chadha, U. et al., "Complex Nanomaterials in Catalysis for Chemically Significant Applications: From Synthesis and Hydrocarbon Processing to Renewable Energy Applications," Advances in Material Science and Engineering 2022:1552334 (Feb. 2022).
Li, W. et al., "Comparison of copper and aluminum doped cobalt ferrate nanoparticles for improving biohydrogen production", Bioresource Technology 343: 126078 (2022).
Saleem, S. et al., "Investigating the Impact of Cu2+ Doping on the Morphological, Structural, Optical, and Electrical Properties of CoFe2O4 Nanoparticles for Use in Electrical Devices", Materials (Basel) 15(10): 3502 (2022).
Nivetha, R. et al., "Cobalt and nickel ferrites based graphene nanocomposites for electrochemical hydrogen evolution," J. of Magentism and Magnetic Materials 448: pp. 165-171 (2018).
Kumar, G.R. et al., "Synthesis, Structural and Magnetic Properties of Copper Substituted Nickel Ferrites by Sol-Gel Method", Materials Sciences and Applications 3: pp. 87-91 (2012).
Lasheras, X. et al., "Chemical Synthesis and Magnetic Properties of Monodisperse Nickel Ferrite Nanoparticles for Biomedical Applications," J. Phys. Chem. C 120(6): pp. 3492-3500 (2016).

\* cited by examiner

COBALT AND COPPER-DOPED NICKEL FERRITE NANOPARTICLES AS CATALYST FOR DIRECT METHANOL FUEL CELLS

CROSS-REFERENCE TO RELATED APPLICATION

This application is a continuation-in-part of U.S. patent application Ser. No. 18/231,056, filed on Aug. 7, 2023, now pending, which is a divisional of U.S. patent application Ser. No. 18/124,709, filed on Mar. 22, 2023, now pending.

BACKGROUND

1. Field

The disclosure of the present patent application relates to a catalyst for fuel cells and, particularly, to a catalyst for electrooxidation of methanol in direct methanol fuel cells.

2. Description of the Related Art

Fuel cells directly convert chemical energy of fuel and air to electricity and heat through an electrochemical reaction. Unlike existing power generating technologies, fuel cells do not have a combustion process or a driving device, and therefore, do not induce environmental problems while providing high efficiency. For example, fuel cells provide pollution-free power generation since air pollution substances, such as SOx and NOx, are hardly discharged and only low levels of carbon dioxide are generated. Fuel cells have additional advantages of low noise and no vibration.

The various types of fuel cells include phosphoric acid-type fuel cells (PAFC), alkali-type fuel cells (AFC), polymer electrolyte membrane-type fuel cells (PEMFC), direct methanol fuel cells (DMFC) and solid oxide fuel cells (SOFC).

A direct methanol fuel cell (DMFC) includes an anode to which an aqueous methanol solution is fed as a fuel, a cathode to which an oxidant is fed, and a proton conducting membrane placed between the anode and the cathode. The anode and the cathode each have a current collector for electron conduction and a catalyst layer formed on the current collector. The proton conducting membrane is placed between the respective catalyst layers. Each catalyst layer is made of a mixture of a catalyst and a perfluoroalkylsulfonic acid polymer such as Nafion (trade name, manufactured by DuPont). The perfluoroalkylsulfonic acid polymer in each catalyst layer has high chemical stability and functions to hold the catalyst. It is also used as a component resin to form a proton conducting membrane serving as an electrolyte membrane. Each catalyst layer also typically has catalyst fine particles such as platinum or platinum-ruthenium particles having a particle size of a few nanometers, supported on carbon particles, in which the oxidation or reduction of methanol or oxidant (e.g., air) is carried out.

Although Pt or Pd metals, are typically alluring catalyst candidates, these precious metals are generally costly and difficult to obtain for wide-scale industrial usage.

Thus, cobalt and copper-doped nickel ferrite nanoparticles as catalyst for direct methanol fuel cells, solving the afore-mentioned problems are desired.

SUMMARY

The present subject matter is directed to cobalt and copper-doped nickel Cu/Co—Ni-ferrite ($Cu_xCo_xNi_{(1-x)}$ $Fe_2O_4$) nanoparticles or "CuCoNiFNP" as a catalyst for electrooxidation of methanol in direct methanol fuel cells (DMFC). In an embodiment, the CuCoNiFNP catalyst can be an efficient anode for DMFC in alkaline electrolytes. CuCoNiFNPs can have a sponge-like structure with irregular pores. A diameter of the CuCoNiFNPs can range from about 8 nm to about 30 nm.

In an embodiment, the CuCoNiFNPs can be prepared chemically by using a sol-gel auto-combustion method. The method can include preparing a gel including iron nitrate, cobalt nitrate, nickel nitrate, copper nitrate, and a capping agent; preparing a solid powder from the gel; and calcining the solid powder to provide the CuCoNiFNPs. In an embodiment, the powder can be prepared by drying the gel to provide a dried gel and burning the gel to provide a brittle mass. The brittle mass can be reduced to a powder by grinding, for example. In an embodiment, the capping agent is citric acid.

These and other features of the present subject matter will become readily apparent upon further review of the following specification.

DETAILED DESCRIPTION OF THE PREFERRED EMBODIMENTS

Figure 1A:
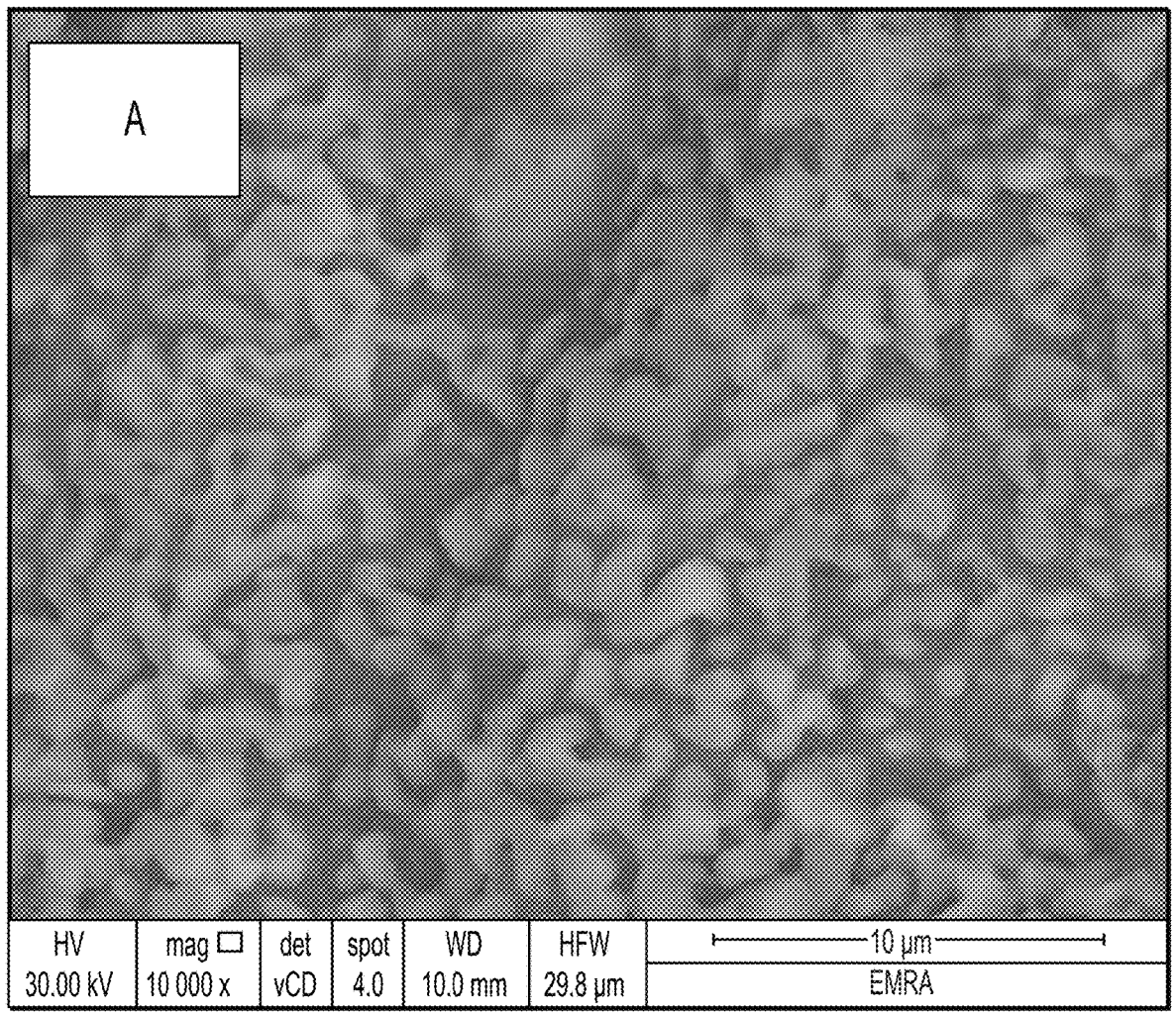
FIG. 1A is a field emission scanning electron micrograph (FESEM) of the $Cu_xCo_xNi_{(1-x)}Fe_2O_4$ material.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to cobalt and copper-doped nickel ferrite ($Cu_xCo_xNi_{(1-x)}Fe_2O_4$) nanoparticles or "CuCoNiFNPs" as a catalyst for electrooxidation of methanol in direct methanol fuel cells (DMFC). In an embodiment, the CuCoNiFNP catalyst can provide an efficient anode for DMFC in alkaline electrolytes. The CuCoNiFNPs can have a sponge-like structure with irregular pores. A diameter of the CuCoNiFNPs can range from about 8 nm to about 30 nm.

In an embodiment, the CuCoNiFNPs can be prepared chemically by using a sol-gel auto-combustion method. In an embodiment, the method can include preparing a solution including iron nitrate, cobalt nitrate, nickel nitrate, copper nitrate, and a capping agent, adjusting a pH of the solution to provide an alkaline solution, heating the alkaline solution to provide a gel, subjecting the gel to a thermal treatment to provide a dry mass, reducing the dry mass to a powder, and calcining the dry mass to provide the CuCoNiFNPs. In an embodiment, the thermal treatment can include drying the gel and subjecting the dried gel to combustion.

According to an embodiment, the gel can be prepared by first dissolving each of iron nitrate (0.01M), cobalt nitrate (0.01M), and nickel nitrate (0.01M) separately in water to provide a nickel nitrate solution, a cobalt nitrate solution, and an iron nitrate solution. Then, the nickel nitrate solution, the cobalt nitrate solution, and the iron nitrate solution can be combined to provide a first mixture. Thereafter, copper nitrate can be added to the first mixture to provide a second mixture. The mixed solution was blended in a specific stoichiometric ratio to verify dopant x value as 0.03 to 0.05. In an embodiment, the capping agent can then be dissolved in water and then added to the second mixture and stirred for a period of time to provide a third mixture. In an embodiment, the capping agent is citric acid. The pH of the third mixture can then be adjusted to a value between pH 8 and pH 9 to provide an alkaline solution. In an embodiment, ammonia is added to the third mixture to adjust the pH. Then, the alkaline solution can be heated to a temperature ranging from about 60° C. to about 80° C. to provide a heated solution. For example, the alkaline solution can be heated to about 65° C., about 70° C., or about 75° C., to provide the heated solution. In an embodiment, the alkaline solution can be heated while stirring to provide the heated solution. The heated solution can then be sealed for about 12 hours to provide a gel. In an embodiment, the gel can then be subjected to a thermal treatment to provide a brittle mass.

In an embodiment, the thermal treatment can include drying the gel and then subjecting the dried gel to combustion to provide the brittle mass. In an embodiment, the gel can be dried in an oven for about 8 hours to about 12 hours at a temperature ranging from about 90° C. to about 110° C. In an embodiment, the gel can be dried in an oven for about 10 hours at about 100° C. The combustion can include burning the resulting dried gel at a temperature ranging from about 165° C. to about 175° C. for a period of time ranging from about 30 minutes to about 2 hours. In an embodiment, the dried gel is burned at a temperature of 170° C. for about 1 hour. Combustion can transform the dried gel to a black, brittle mass. The brittle mass can then be ground to a powder. Then, the powder can be calcined to provide $Cu_xCo_xNi_{(1-x)}Fe_2O_4$ nanoparticles. In an embodiment, the powder can be calcined for about two hours to about five hours at a temperature ranging from about 400° C. to about 500° C. In an embodiment, the powder can be calcined for about three hours at about 420° C.

Figure 1B:
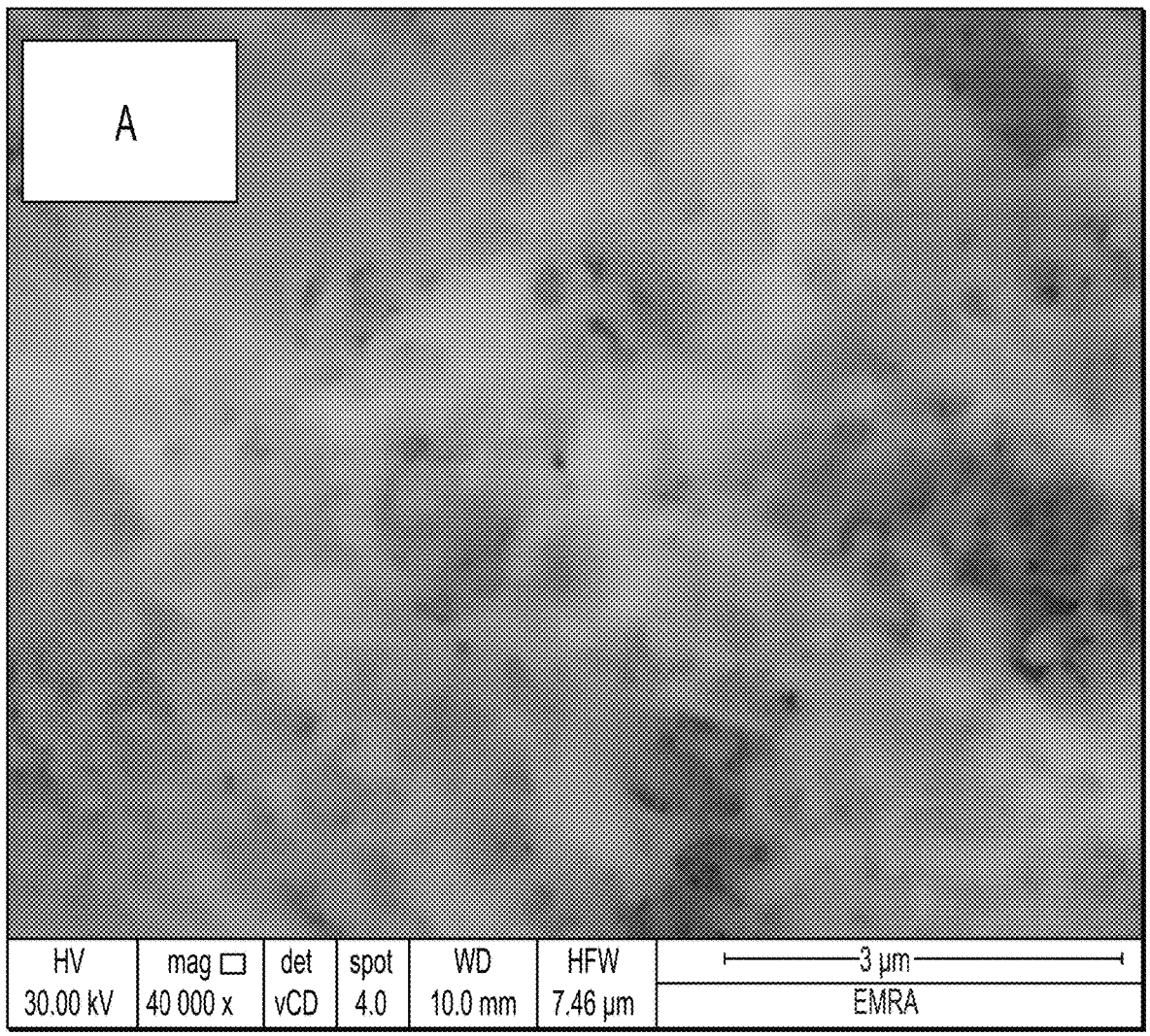
FIG. 1B is a field emission scanning electron micrograph (FESEM) of the $Cu_xCo_xNi_{(1-x)}Fe_2O_4$ material.
Figure 2A:
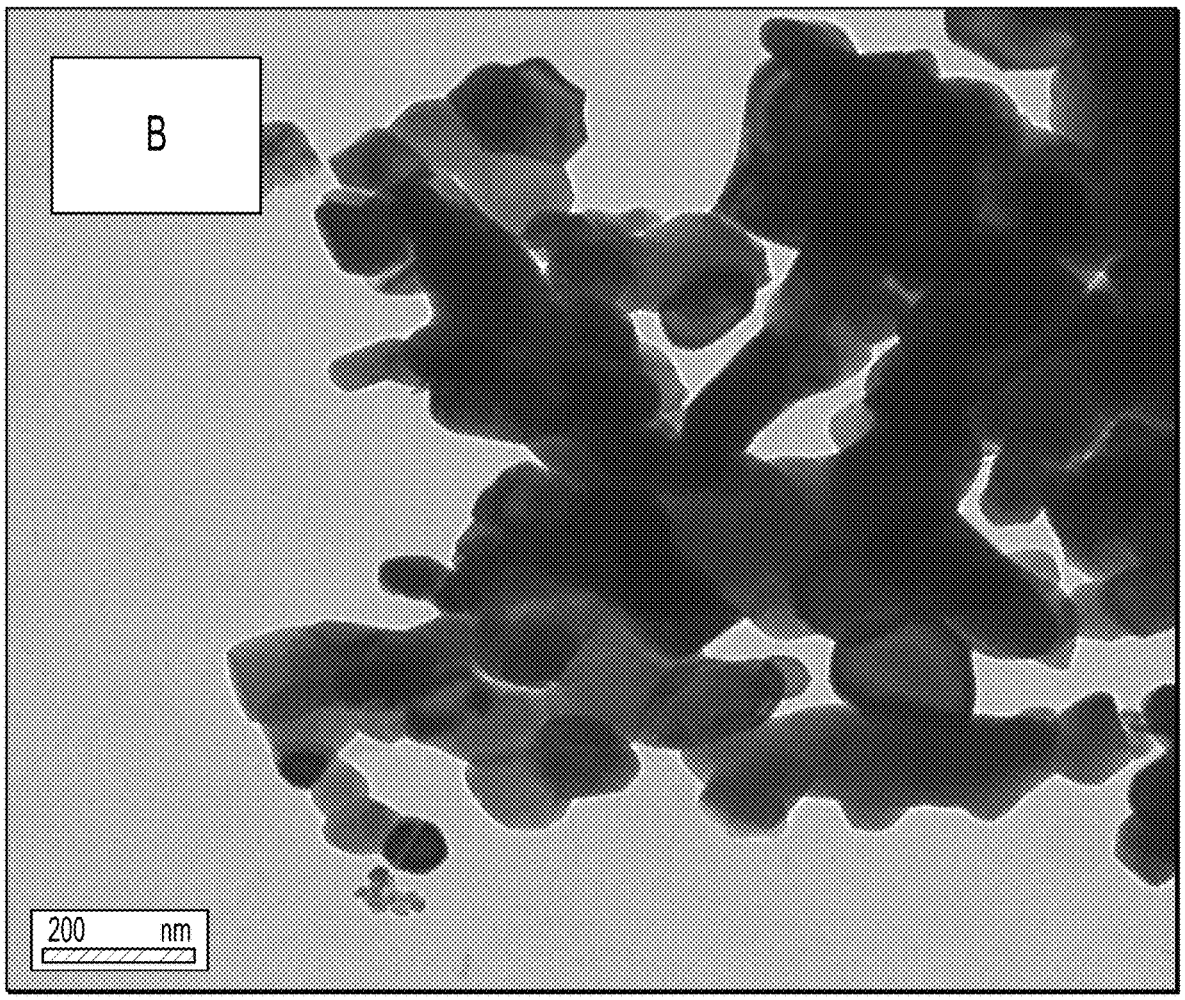
FIG. 2A is a transmission electron micrograph (TEM) of the $Cu_xCo_xNi_{(1-x)}Fe_2O_4$ material.
Figure 2B:
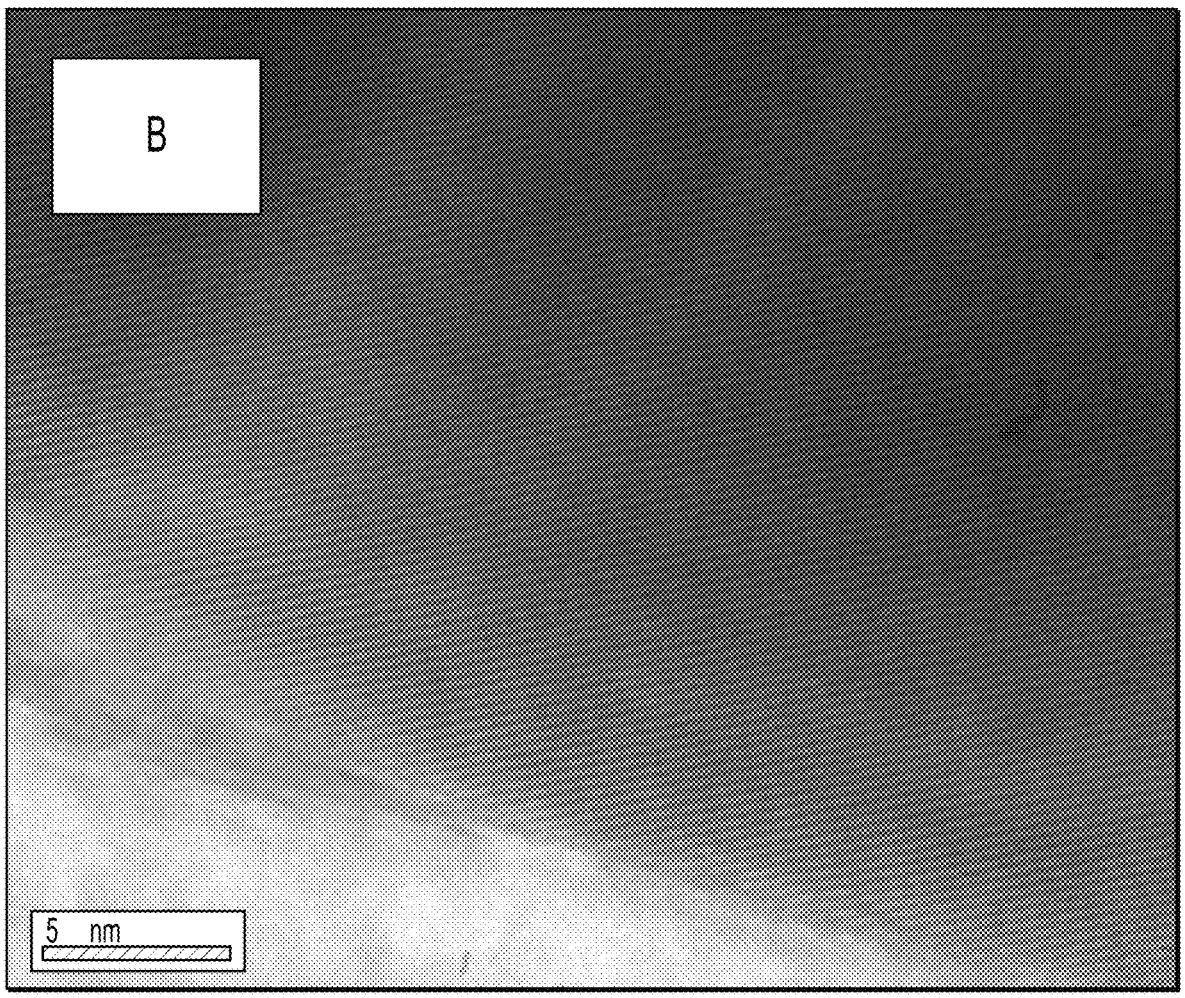
FIG. 2B is a transmission electron micrograph (TEM) of the $Cu_xCo_xNi_{(1-x)}Fe_2O_4$ material.

FIGS. 1A and 1B are FE-SEM images of the $Cu_xCo_xNi_{(1-x)}Fe_2O_4$ material at two different magnifications. The morphology of the $Cu_xCo_xNi_{(1-x)}Fe_2O_4$ nanoparticles is sponge-like with irregularly shaped pores. It is believed that the method of synthesizing the $Cu_xCo_xNi_{(1-x)}Fe_2O_4$ nanoparticles, which involved combustion at 170° C. followed by calcination at 420° C., results in the development of the uneven porosity network. The morphological properties of $Cu_xCo_xNi_{(1-x)}Fe_2O_4$ as seen in FIGS. 1A-1B were validated by TEM analysis. FIGS. 2A-2B show transmission electron microscopy (TEM) images of the $Cu_xCo_xNi_{(1-x)}Fe_2O_4$ material at two different magnifications. As shown in FIGS. 2A-2B, the developed material includes random nanoscale and semi-spherical particles. The particles' diameter ranges from about 8 nm to about 30 nm.

As described herein, the electrochemical effectiveness of the synthesized $Cu_xCo_xNi_{(1-x)}Fe_2O_4$ nanoparticles as an electrode for electrocatalytic methanol oxidation was investigated. According to electrochemical investigations, the inclusion of $Cu_xCo_xNi_{(1-x)}Fe_2O_4$ material significantly improved current values. The strong electrochemical stability of the produced electrode was shown by the calculated deactivation rate of the anodic current density for the $Cu_xCo_xNi_{(1-x)}Fe_2O_4$ material. Accordingly, the $Cu_xCo_xNi_{(1-x)}Fe_2O_4$ material can be used for the simple production of electrodes in direct methanol fuel cells (DMFC).

Figure 3:
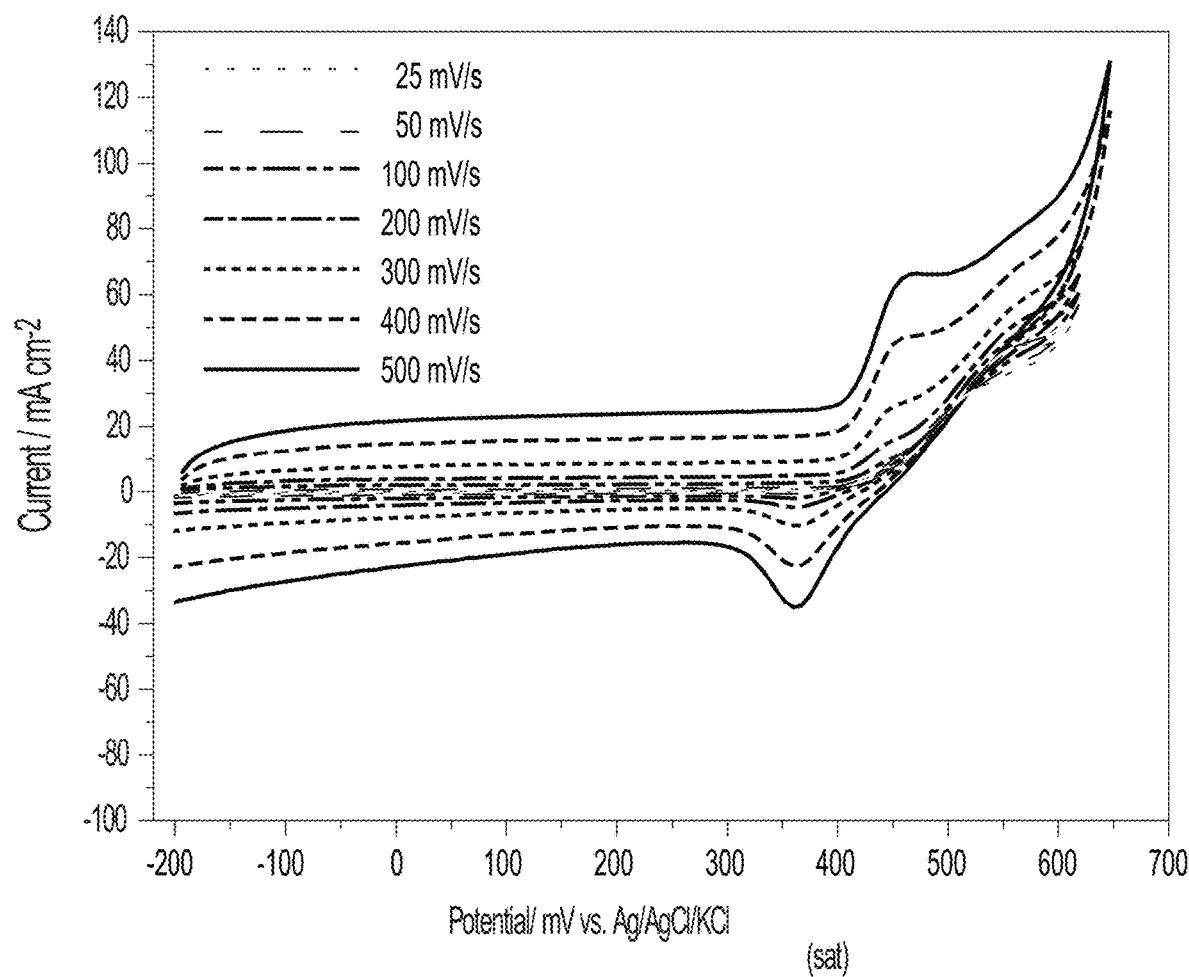
FIG. 3 is a cyclic voltammogram of Cu/Co—Ni-ferrites electrodes in 0.5 M MeOH/1.0 M KOH medium at different scan rates at 25° C.

In an experiment, the Cu/Co—Ni-ferrites demonstrated satisfactory electrocatalytic performance as an electrocatalyst for methanol anodic processes. FIG. 3 is a cyclic voltammogram (CV) of Cu/Co—Ni-ferrites electrodes in 0.5 M MeOH/1.0 M KOH medium at different scan rates at 25° C. Oxidation and reduction peaks can be easily observed at 436 mV and 372 mV vs. Ag/AgCl in the oxidation and reduction plots, respectively. This characteristic, which can be caused by Ni, e.g., $Ni^{(III)}/Ni^{(II)}$, is prevalent in the electrochemical investigation of Ni-composite electrodes. The Cu/Co—Ni-ferrites demonstrated satisfactory electrocatalytic performance, as evidenced by the obvious rise in the oxidation current that was seen. When compared to the current density produced when methanol was absent (around 0.75 mA/cm$^2$), methanol oxidation started in the CV curve at 401 mV and continued until the anodic peak. The resulting current density then reached 73.9 mA/cm$^2$. This difference in current density data shows that the Cu/Co—Ni-ferrite electrode successfully electrooxidized methanol. Also, the peaks and regions of the CV improved as the scan rate increased, indicating the strong electrocatalytic efficacy of the Cu/Co—Ni-ferrites electrode towards methanol electrooxidation.

The inclusion of $Cu_xCo_xNi_{(1-x)}Fe_2O_4$ significantly improved the obtained current values. The current value increased from 0.21 mA/cm2 at 0.425 V to 6.61 mA/cm2 at 0.612 V during methanol electrooxidation over $Cu_xCo_xNi_{(1-x)}Fe_2O_4$, which is almost 308 times the current density value (0.0214 mA/cm$^2$ at 0.61 V) reported in the absence of methanol Additionally, the improvement in anodic current density and charge transfer resistances suggests that the $Cu_xCo_xNi_{(1-x)}Fe_2O_4$ catalyst has electro-oxidized methanol. Accordingly, the $Cu_xCo_xNi_{(1-x)}Fe_2O_4$ catalyst is an efficient anode for DMFC at high pH.

It is to be understood that the cobalt and copper-doped nickel Cu/Co—Ni-ferrite ($Cu_xCo_xNi_{(1-x)}Fe_2O_4$) nanoparticles are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. Cobalt and copper-doped nickel ferrite nanoparticles prepared according to a method comprising:
   preparing a gel including iron nitrate, cobalt nitrate, nickel nitrate, copper nitrate, and a capping agent;
   drying the gel to provide a dried gel;
   burning the dried gel to provide a brittle mass;
   reducing the brittle mass to a powder; and
   calcining the powder to provide cobalt and copper-doped nickel ferrite nanoparticles;
   wherein the cobalt and copper-doped nickel ferrite nanoparticles have the general formula $Cu_xCo_xNi_{(1-x)}Fe_2O_4$;
   wherein x equals about 0.03 to about 0.05; and
   wherein the cobalt and copper-doped nickel ferrite nanoparticles are sponge-like with irregularly shaped pores.

2. The cobalt and copper-doped nickel ferrite nanoparticles of claim 1, wherein x equals 0.05.

3. The cobalt and copper-doped nickel ferrite nanoparticles of claim 1, wherein the capping agent is citric acid.

4. The cobalt and copper-doped nickel ferrite nanoparticles of claim 1, wherein drying the gel comprises heating the gel to a temperature ranging from about 90° C. to about 110° C. for a period of time ranging from about 8 hours to about 12 hours.

5. The cobalt and copper-doped nickel ferrite nanoparticles of claim 1, wherein burning the dried gel can include heating the dried gel at a temperature ranging from about 165° C. to about 175° C. for a period of time ranging from about 30 minutes to about 2 hours.

6. The cobalt and copper-doped nickel ferrite nanoparticles of claim 1, wherein the brittle mass is reduced to a powder by grinding.

7. The cobalt and copper-doped nickel ferrite nanoparticles of claim 1, wherein the powder is calcined for about two hours to about five hours at a temperature ranging from about 400° C. to about 500° C.

8. The cobalt and copper-doped nickel ferrite nanoparticles of claim 1, wherein the powder is calcined for about three hours at about 420° C.

9. Cobalt and copper-doped nickel ferrite nanoparticles prepared according to a method comprising:
   preparing a gel including iron nitrate, cobalt nitrate, nickel nitrate, copper nitrate, and citric acid;
   drying the gel to provide a dried gel;
   burning the dried gel to provide a brittle mass;
   reducing the brittle mass to a powder; and
   calcining the powder to provide cobalt and copper-doped nickel ferrite nanoparticles; and
   wherein the gel is prepared by:
   dissolving iron nitrate in water to provide an iron nitrate solution;
   dissolving cobalt nitrate in water to provide a cobalt nitrate solution;
   dissolving nickel nitrate in water to provide a nickel nitrate solution;
   combining the iron nitrate solution, the cobalt nitrate solution, and the nickel nitrate solution to provide a first mixture;
   adding copper nitrate to the first mixture to provide a second mixture;
   adding a capping agent to the second mixture to provide a third mixture;
   adjusting a pH of the third mixture to provide an alkaline solution;
   heating the alkaline solution to provide a heated solution; and
   sealing the heated solution to provide a gel;
   wherein the cobalt and copper-doped nickel ferrite nanoparticles have the general formula $Cu_xCo_xNi_{(1-x)}Fe_2O_4$;
   wherein x equals about 0.03 to about 0.05; and wherein the cobalt and copper-doped nickel ferrite nanoparticles are sponge-like with irregularly shaped pores.

10. The cobalt and copper-doped nickel ferrite nanoparticles of claim 9, wherein x equals 0.05.

11. The cobalt and copper-doped nickel ferrite nanoparticles of claim 9, wherein the capping agent is citric acid.

12. The cobalt and copper-doped nickel ferrite nanoparticles of claim 9, wherein drying the gel comprises heating the gel to a temperature ranging from about 90° C. to about 110° C. for a period of time ranging from about 8 hours to about 12 hours.

13. The cobalt and copper-doped nickel ferrite nanoparticles of claim 9, wherein burning the dried gel can include heating the dried gel at a temperature ranging from about 165° C. to about 175° C. for a period of time ranging from about 30 minutes to about 2 hours.

14. The cobalt and copper-doped nickel ferrite nanoparticles of claim 9, wherein the brittle mass is reduced to a powder by grinding.

15. The cobalt and copper-doped nickel ferrite nanoparticles of claim 9, wherein the powder is calcined for about two hours to about five hours at a temperature ranging from about 400° C. to about 500° C.

16. The cobalt and copper-doped nickel ferrite nanoparticles of claim 9, wherein the powder is calcined for about three hours at about 420° C.

* * * * *